United States Patent [19]

Hessert et al.

[11] 3,926,258

[45] Dec. 16, 1975

[54] METHOD FOR REDUCING FORMATION PERMEABILITY WITH GELLED POLYMER SOLUTION HAVING DELAYED GEL TIME

[75] Inventors: James E. Hessert; Chester C. Johnston, Jr., both of Bartlesville, Okla.

[73] Assignee: Phillips Petroleum Company, Bartlesville, Okla.

[22] Filed: Feb. 12, 1974

[21] Appl. No.: 441,848

Related U.S. Application Data

[63] Continuation-in-part of Ser. No. 318,847, Dec. 27, 1972, abandoned.

[52] U.S. Cl. ............... 166/294; 166/295; 166/275
[51] Int. Cl.² ................. E21B 33/138; E21B 43/22
[58] Field of Search .......... 166/294, 295, 270, 274, 166/275, 246; 252/316; 175/65, 72

[56] References Cited
UNITED STATES PATENTS

| | | | |
|---|---|---|---|
| 3,208,524 | 9/1965 | Horner et al. | 166/294 |
| 3,241,612 | 3/1966 | Hiller | 166/294 X |
| 3,306,870 | 2/1967 | Eilers et al. | 166/295 X |
| 3,502,149 | 3/1970 | Pence, Jr. | 166/295 |
| 3,611,733 | 10/1971 | Eilers et al. | 166/294 X |
| 3,658,129 | 4/1972 | Lanning et al. | 166/270 |
| 3,687,200 | 8/1972 | Routson | 166/295 X |
| 3,749,172 | 7/1973 | Hessert | 166/270 X |
| 3,749,174 | 7/1973 | Friedman et al. | 166/294 |

*Primary Examiner*—Stephen J. Novosad

[57] ABSTRACT

The permeability of a subterranean formation is reduced by mixing a polymer, water, and a water soluble compound of a multivalent metal capable of furnishing multivalent metal ions to form a first mixture, thereafter mixing a complexing agent with the first mixture to form a second mixture, thereafter mixing a reducing agent with the second mixture to form a third mixture, and passing the third mixture having a delayed or extended gel time into the subterranean formation.

14 Claims, No Drawings

METHOD FOR REDUCING FORMATION PERMEABILITY WITH GELLED POLYMER SOLUTION HAVING DELAYED GEL TIME

This application is a continuation-in-part of our copending application Ser. No. 318,847, filed Dec. 27, 1972 now abandoned.

In the art of producing hydrocarbons from a subterranean hydrocarbon containing formation, it is often desirable to reduce the permeability of preselected portions of the formation. One example of where it is desirable to reduce the permeability of the formation would be in that portion of the formation adjacent a well bore which forms a pathway for water to pass from the formation into the well bore. Another example is decreasing the permeability of formations prior to or during secondary recovery operations, such as fluid drive processes.

One of the problems often encountered in utilizing gelable solutions of polymeric materials to reduce the permeability of subterranean formations is delaying or extending the gel time sufficiently to provide sufficient time for passing the gelable material downwardly through a well bore and through the formation to a desired location in the formation.

This invention therefore resides in reducing the permeability of a subterranean formation by mixing a polymer, water, and a water soluble compound of a multivalent metal capable of furnishing multivalent metal ions to form a first mixture, thereafter mixing a complexing agent with the first mixture to form a second mixture, thereafter mixing a reducing agent with the second mixture to form a third mixture, and passing the third mixture having a delayed or extended gel time into the subterranean formation.

In the method of this invention, a polymer, a water soluble compound of a multivalent metal capable of furnishing multivalent metal ions, and water are mixed together to form a first mixture.

Polymers that have been found to be particularly useful in this process are polyacrylamides, polysaccharides, cellulosic polymers, and mixtures thereof. Examples of these polymers are

| Polyacrylamide | |
|---|---|
| Dow Pusher 700; Dow Pusher 1000 | Manufactured by Dow Chemical Company, Midland, Michigan |
| Polyfloc 1160 Betz HiVis | Manufactured by Betz Laboratories, Inc., Trevose, Pennsylvania 19047. |
| Polysaccharide Kelzan MF | See U.S. Patents 3,208,524 and 3,383,307 Manufactured by Kelco, Inc., San Diego, California - U.S. Patent 3,000,790. |
| Cellulosic polymers (water soluble) Alkyl and hydroalkyl cellulose derivative Carboxymethyl cellulose (CMC) Carboxyethyl cellulose Carboxymethyl hydroxyethyl cellulose (CMHEC) | |

Included among the cellulosic polymers which can be used in the practice of the invention are the water-soluble cellulose ethers. In general, any of the water-soluble cellulose ethers can be used in the practice of the invention. Said cellulose ethers which can be used include, among others: the various carboxyalkyl cellulose ethers, e.g., carboxyethyl cellulose and carboxymethyl cellulose (CMC); mixed ethers such as carboxyalkyl hydroxyalkyl ethers, e.g., carboxymethyl hydroxyethyl cellulose (CMHEC); hydroxyalkyl celluloses such as hydroxyethyl cellulose, and hydroxypropyl cellulose; alkylhydroxyalkyl celluloses such as methylhydroxypropyl cellulose; alkyl cellulose such as methyl cellulose, ethyl cellulose, and propyl cellulose; alkylcarboxyalkyl cellulose such as ethylcarboxymethyl cellulose; alkylalkyl celluloses such as methylethyl cellulose; and hydroxyalkylalkyl celluloses such as hydroxypropylmethyl cellulose; and the like. Many of said cellulose ethers are available commerically in various grades. The carboxy-substituted cellulose ethers are avaiable as the alkali metal salt, usually the sodium salt. However, the metal is seldom referred to and they are commonly referred to as CMC, CMHEC, etc. For example, water-soluble CMC is available in various degress of carboxylate substitution ranging from about 0.3 up to the maximum degree of substitution of 3.0. In general, CMC having a degree of substitution in the range of 0.65 to 0.95 is preferred. Frequently CMC having a degree of substitution in the range of 0.85 to 0.95 is a more preferred cellulose ether. CMC having a degree of substitution less than the above-preferred range is usually less uniform in properties and thus less desirable for use in the practice of the invention. CMC having a degree of substitution greater than the above-preferred ranges usually has a lower viscosity and more is required in the practice of the invention. Said degree of substitution of CMC is commonly designated in practice as CMC—7, CMC—9, CMC—12, etc., where the 7, 9, and 12 refer to a degree of substitution of 0.7, 0.9, and 1.2, respectively.

In the above-described mixed ethers, it is preferred that the portion thereof which contains the carboxylate groups be substantial instead of a mere trace. For example, in CMHEC it is preferred that the carboxymethyl degree of substitution be at least 0.4. The degree of hydroxyethyl substitution is less important and can vary widely, e.g., from about 0.1 or lower to about 4 or higher.

Included among the polysaccharides which can be used in the practice of the invention are the biopolysaccharides produced by the action of bacteria of the genus Xanthomonas on carbohydrates. These materials are thus biochemically synthesized polysaccharides and can be referred to as biopolysaccharides to distinguish them from naturally occurring polysaccharides. Representative species of said Xanthomonas bacteria include *Xanthomonas begoniae, Xanthomonas campestris, Xanthomonas carotae, Xanthomonas corylina, Xanthomonas gummisudans, Xanthomonas hederae, Xanthomonas incanae, Xanthomonas lespedezae, Xanthomonas malvacearum, Xanthomonas holcicola, Xanthomonas papavericola, Xanthomonas phaseoli, Xanthomonas pisi, Xanthomonas translucens, Xanthomonas vasculorum* and *Xanthomonas vesicatoria*. It has been shown in the prior art that the production of such biopolysaccharides is a characteristic trait of members of the Xanthomonas genus. Certain species produce the polymers with particular efficency and are thus preferred. These preferred species include *Xanthomonas begoniae, Xanthomonas campestris, Xanthomonas incanae*, and *Xanthomonas pisi*.

A wide variety of carbohydrates can be fermented with bacteria of the genus Xanthomonas to produce said biopolysaccharides. Suitable carbohydrates include sucrose, glucose, maltose, fructose, lactose, galactose, soluble starch, corn strach, potato starch, and the like. The prior art has also shown that the carbohydrates need not be in a highly refined state and that crude materials from natural sources can be utilized. Examples of suitable such natural source materials include crude molasses, raw sugar, raw potato starch, sugar beet juice, and the like. Since they are much less expensive than the corresponding refined carbohydrates, such natural source materials are frequently preferred for use as the substrate in preparing said biopolysaccharides.

Fermentation of the carbohydrate to produce said biopolysaccharides can be carried out in an aqueous medium containing from about 1 to 5 percent of the carbohydrate, from about 0.1 to 0.5 weight percent of dipotassium acid phosphate, and from about 0.1 to 10 weight percent of a suitable nutrient containing suitable trace elements and organic nitrogen sources. Commercially available distillers solubles such as "Stimuflav" sold by Hiram Walker and Sons is an example of such a nutrient. Some of the crude carbohydrate sources mentioned above, such as raw sugar beet juice, apparently contain the trace elements and organic nitrogen sources in sufficient quantity to make the addition of a nutrient unnecessary. It has been reported that good results have been obtained with raw sugar beet juice without the addition of a nutrient. The fermentation is usually carried out at a temperature between about 70° and 100°F for about 1 to about 3 days after sterilizing the medium and inoculating it with bacteria of the genus Xanthomonas. Further details regarding the preparation of said biopolysaccharides can be found in U.S. Pat. Nos. 3,020,206, issued Feb. 6, 1962; 3,243,000 issued Mar. 29, 1966; and 3,163,602 issued Dec. 29, 1964. Polysaccharide B–1459 is an example of a biopolysaccharide produced by the action of Xanthomonas campestris bacteria, and which is commercially available in various grades under the trademark "Kelzan" from the Kelco Company, Los Angeles, Calif.

Included among the polyacrylamides which can be used in the practice of the invention are the various polyacrylamides and related polymers which are water-dispersible and which can be used in an aqueous medium, with the gelling agents described herein, to give an aqueous gel. Presently preferred polymers include the various substantially linear homopolymers and copolymers of acrylamide and methacrylamide. By substantially linear it is meant that the polymers are substantially free of crosslinking between the polymer chains. Said polymers can have up to about 75, preferably up to about 45, percent of the carboxamide groups hydrolyzed to carboxyl groups. As used herein and in the claims, unless otherwise specified, the term "hydrolyzed" includes modified polymers wherein the carboxyl groups are in the acid form and also such polymers wherein the carboxyl groups are in the salt form, provided said salts are water-dispersible. Such salts include the ammonium salts, the alkali metal salts, and others which are water-dispersible. Hydrolysis can be carried out in any suitable fashion, for example, by heating an aqueous solution of the polymer with a suitable amount of sodium hydroxide.

Substantially linear polyacrylamides can be prepared by methods known in the art. For example, the polymerization can be carried out in aqueous medium, in the presence of a small but effective amount of a water-soluble oxygen-containing catalyst, e.g., a thiosulfate or bisulfate of potassium or sodium or an organic hydroperoxide, at a temperature between about 30° and 80°C. The resulting polymer is recovered from the aqueous medium, as by drum drying, and can be subsequently ground to the desired particle size. A presently preferred particle size is such that about 90 weight percent will pass through a number 10 mesh sieve, and not more than about 10 weight percent will be retained on a 200 mesh sieve (U.S. Bureau of Standards Sieve Series).

Included among the copolymers which can be used to prepare gels for use in the practice of the invention are the water-dispersible copolymers resulting from the polymerization of a major proportion of acrylamide or methacrylamide and a minor proportion of an ethylenically unsaturated monomer copolymerizable therewith. It is desirable that sufficient acrylamide or methacrylamide be present in the monomers mixture to impart to the copolymer the above-described water-dispersible properties, for example, from about 60 to 99 percent acrylamide and from about 1 to 40 percent other ethylenically unsaturated monomers, preferably from about 75 to 95 percent acrylamide and from 5 to 25 percent other ethylenically unsaturated monomer. Such other monomers include acrylic acid, methacrylic acid, vinylsulfonic acid, vinylbenzylsulfonic acid, vinylbenzenesulfonic acid, vinyl acetate, acrylonitrile, methyl acrylonitrile, vinyl alkyl ether, vinyl chloride, maleic anhydride, vinyl substituted cationic quaternary ammonium compounds, and the like. Various methods are known in the art for preparing said copolymers. For example, see U.S. Pat. Nos. 2,625,529; 2,740,522; 2,729,557; 2,831,841; and 2,909,508. Said copolymers can also be used in the hydrolyzed form, as discussed above for the homopolymers.

Polyacrylic acids, including polymethacrylic acid, prepared by methods known in the art, can also be used to prepare gels for use in the practice of the invention.

Polyacrylates, e.g., as described in Kirk-Othmer, "Encyclopedia of Chemical Technology," Vol. I, second edition, pages 305 et seq., Interscience Publishers, Inc., New York (1963), can also be used to prepare gels for use in the practice of the invention. Examples of said polyacrylates include polymers of methyl acrylate, ethyl acrylate, n-propyl acrylate, isopropyl acrylate, n-butyl acrylate, isobutyl acrylate, tert-butyl acrylate, n-octyl acrylate, and the like.

Polymers of N-alkyl-substituted acrylamides wherein the nitrogen atoms in the carboxamide groups can have from 1 to 2 alkyl substituents which contain one to four carbon atoms can also be used to prepare gels for use in the practice of the invention. Examples of said N-substituted acrylamides include, among others, N-methyl acrylamide, N-propyl acrylamide, N-butyl acrylamide, N,N-dimethyl acrylamide, N-methyl-N-sec-butyl acrylamide, and the like, at various stages of hydrolysis, as described above.

Crosslinked polyacrylamides and crosslinked polymethacrylamides, at various stages of hydrolysis as described above, can also be used to prepare gels for use in the practice of the invention. In general, said crosslinked polyacrylamides can be prepared by the methods described above, but including in the monomeric mixture a suitable amount of a suitable crosslinking agent. Examples of crosslinking agents include methylenebisacrylamide, divinylbenzene, vinyl ether, divinyl ether, and the like. Said crosslinking agents can be used in small amounts, e.g., up to about 1 percent by weight of the monomeric mixture. Such crosslinking is to be distinguished from any crosslinking which occurs when solutions of polymers are gelled as described herein.

All the polymers useful in preparing gels for use in the practice of the invention are characterized by high molecular weight. The molecular weight is not critical so long as the polymer has the above-described water-dispersible properties. It is preferred that the polymer have a molecular weight of at least 100,000. The upper limit of molecular weight is unimportant so long as the polymer is water-dispersible, and the aqueous gel prepared therefrom can be pumped. Thus, polymers having molecular weights as high as 20,000,000 or higher, and meeting said conditions, can be used.

The first aqueous mixture will preferably have a polymer concentration in the range of about 250 ppm to about 20,000 ppm and a multivalent metal containing compound concentration in the range of about 10 ppm to about 2500 ppm. The water of the first mixture can be either fresh water or brine. Generally speaking, fresh water is usually preferred when available, as discussed further hereinafter The amount of the above-described polymers used in preparing gels for use in the practice of the invention can vary widely depending upon the particular polymer used, the purity of said polymer, and properties desired in said aqueous gels. In general, the amount of polymer used will be a water-thickening amount, i.e., at least an amount which will significantly thicken the water to which it is added. For example, amounts in the order of 25 to 100 parts per million weight (0.0025 to 0.01 weight percent) have been found to significantly thicken water. Generally speaking, amounts of the above-described polymers in the range of from 0.025 to 5, preferably 0.025 to 2, weight percent, based on the weight of water, can be used in preparing gels for use in the practice of the invention. However, amounts outside said ranges can be used. In general, with the proper amounts of polyvalent metal and reducing agent, the amount of polymer used will determine the consistency of the gel obtained. Small amounts of polymer will usually produce liquid mobile gels which can be readily pumped. Large amounts of polymer will usually produce thicker, more viscous, somewhat elastic gels. If desired, said thick gels can be "thinned" by dilution with water to any desired concentration of polymer. This can be done by mechanical means, e.g., stirring, pumping, or by means of a suitable turbulence inducing device to cause shearing, such as a jet nozzle. Thus, there is really no fixed upper limit on the amount of polymer which can be used.

Multivalent metal compounds which can be used in the practice of the invention are water-soluble compounds of polyvalent metals wherein the metal is present in a valence state which is capable of being reduced to a lower polyvalent state. Examples of such compounds include potassium permanganate, sodium permanganate, ammonium chromate, ammonium dichromate, the alkali metal chromates, the alkali metal dichromates, and chromium trioxide. Sodium dichromate and potassium dichromate, because of low cost and ready availability are the presently preferred metal-containing compounds for use in the practice of the invention. The hexavalent chromium in said chromium compounds is reduced in situ to trivalent chromium by suitable reducing agents. In the permanganate compounds, the manganese is reduced from +7 valence to +4 valence, as in $MnO_2$.

The amount of said metal-containing compounds used will be a sensible amount, i.e., a small but finite amount which is more than incidental impurities, but which is effective or sufficient to cause subsequent gelation when the metal in the polyvalent metal compound is reduced to a lower polyvalent valence state. The lower limit of the concentration of the starting metal-containing compound will depend upon several factors including the particular type of polymer used, the concentration of the polymer in the water to be gelled, the water which is used, and the type of gel product desired. For similar reasons, the upper limit on the concentration of the starting metal-containing compound also cannot always be precisely defined. However, it should be noted that excessive amounts of the starting metal compound, for example +6 chromium, which can lead to excessive amounts of +3 chromium when there is sufficient reducing agent present to reduce the excess +6 chromium, can adversely affect the stability of the gels produced. As a general guide, the amount of the starting polyvalent metal-containing compound used in preparing aqueous gels for use in the practice of the invention will be in the range of from 0.05 to 40, preferably 0.5 to 40, more preferably 2 to 30, weight percent of the amount of the polymer used. However, in some situations it may be desirable to use amounts of the starting polyvalent metal-containing compound which are outside the above ranges. Such use is within the scope of the invention. Those skilled in the art can determine the amount of starting polyvalent metal-containing compound to be used by simple experiments carried out in the light of this disclosure. For example, when brines, such as are commonly available in producing oil fields, are used in the water in preparing gels for use in the practice of the invention, less of the starting polyvalent metal-containing compound is required than when distilled water is used. Suitable gels can be prepared using brines having a wide range of dissolved solids content, depending upon the particular polymer and brine used. Gelation rates are frequently faster when using said brines. Such oil field brines commonly contain varying amounts of sodium chloride, calcium chloride, magnesium chloride, etc. Sodium chloride is usually present in the greatest concentration.

Generally speaking, water having a low (or essentially none) total dissolved solids content is the preferred medium for preparing the gels described herein. Generally speaking, when brines are used suitable gels can be obtained when the total dissolved solids content is not greater than about 60,000, and the amount of polyvalent metal ions such as calcium, magnesium, etc., is not greater than about 6,000.

The above-described first mixture is thereafter mixed with a complexing agent to form a second mixture. Examples of complexing agents which can be used in the practice of this invention include, among others, citrates, tartrates, acetates, phosphates, hydrophosphites, or arsenates, for example, citric acid, ferric hydrophosphite, aluminum acetate, sodium potassium tartrate, calcium arsenate, and sodium phosphate. Organic complexing agents can also be used in the practice of the invention. An example of such an organic complexing agent is the green food coloring material identified as the disodium salt of 4-{ [4-(N-ethyl-p-sulfobenzylamino)-phenyl]-(4-hydroxy-2-sulfoniumphenyl) -methylene}-[1-(N-ethyl-N-p-sulfobenzyl)-$\Delta^{2,5}$-cyclohexadienimine ].

The second mixture can have a complexing agent concentration in the range of about 5 ppm to about 5000 ppm. The amount of said complexing agents used in the practice of the invention will be an amount which is sufficient to delay or increase the gelling time of the polymer solution in which said agent is used. Thus, the amount of complexing agent used will, in general, depend upon such related factors as how much delay in gelling or increase in gelling time is desired, the particular complexing agent used, the type and depth of the formation being treated, the amount of starting multivalent metal-containing compound used, etc. Thus, there are no real fixed limits on the amount of said complexing agents used. However, as a guide to those skilled in the art, the amount of said complexing agent used will usually be within the range of from 10 to 300 weight percent of the weight of said starting multivalent metal-containing compound which is used. In most instances, it will be preferred to use an amount of complexing agent which is within the range of from 50 to 250 weight percent of the weight of said starting multivalent metal-containing compound. However, it is within the scope of the invention to use amounts of said complexing agents which are outside said ranges. It will usually be desirable to use sufficient of said complexing agent to delay or extend the gelling time sufficient to permit the solution to be pumped to the bottom of the borehole and start into the formation before significant gelation occurs, e.g., an extension of time in the order of up to about one hour, or longer, depending upon borehole depth and the formation being treated.

The second mixture is thereafter mixed with a reducing agent to form a third mixture. Said reducing agent reduces the valence of at least a portion of the metal ions to a lesser valence, and at least a portion of the newly reduced metal ions are apparently complexed by the complexing agent, as discussed further hereinafter. Examples of reducing agents which can be used in the practice of the invention include sulfur-containing compounds such as sodium sulfite, sodium hydrosulfite, potassium hydrosulfite, sodium metabisulfite, potassium sulfite, sodium bisulfite, potassium bisulfite, potassium metabisulfite, sodium sulfide, potassium sulfide, sodium thiosulfate, potassium thiosulfate, ferrous sulfate, thioacetamide, and others; and nonsulfur-containing compounds such as hydroquinone, ferrous chloride, p-hydrazinobenzoic acid, hydrazine phosphite, hydrazine dichloride, and others.

The third mixture can have a reducing agent concentration in the range of about 5 ppm to about 2500 ppm. The amount of reducing agent to be used in the practice of the invention will be a sensible amount, i.e., a small but finite amount which is more than incidental impurities, but which is effective or sufficient to reduce at least a portion of the higher valence metal in the starting polyvalent metal-containing compound to a lower polyvalent valence state. Thus, the amount of reducing agent to be used depends, to some extent at least, upon the amount of the starting polyvalent metal-containing compound which is used. In many instances, it will be preferred to use an excess of reducing agent to compensate for dissolved oxygen in the water, exposure to air during preparation of the gels, and possible contact with other oxidizing substances such as might be encountered in field operations. As a general guide, the amount of reducing agent used will generally be within the range of from 0.1 to at least 150, preferably at least about 200, weight percent of the stoichiometric amount required to reduce the metal in the starting polyvalent metal-containing compound to said lower polyvalent valence state, e.g., +6 Cr to +3 Cr. However, in some instances, it may be desirable to use amounts of reducing agent outside said ranges. The use of such amounts is within the scope of the invention. Those skilled in the art can determine the amount of reducing agent to be used by simple experiments carried out in the light of this disclosure.

It has been discovered that this process is particularly useful in crosslinking polymers in brine solutions which have the properties of short gel times. It has also been discovered that if a polymer solution gels rapidly, the resultant gel will sometimes have a lower stability and quality than the gelled polymer solutions of this process.

The reaction mechanism(s) involved in the action of said complexing agents in delaying or extending the gelation time of polymer soultions in accordance with the invention is not completely understood at this time. While it is not intended to limit the invention by any theories as to the nature of said reaction mechanism(s), it is presently believed that the above-described complexing agents, e.g., citric acid, in some manner complex with, chelate, or otherwise react with, at least a portion of the newly reduced polyvalent metal ions. It is believed said complexing agents are thus in competition with the polymer for said newly reduced polyvalent metal ions, and temporarily reduce the number of said ions available for reaction with, e.g., crosslinking, the polymer. Apparently some sort of equilibrium is established, said newly reduced metal ions are slowly released from their reaction product with said complexing agent and made available for reaction with said polymer, and the gelation time of the polymer solution is thus delayed or extended. Thus, herein and in the claims, unless otherwise specified, the terms "complex," "complexed," "complexing," when employed in connection with the above-described complexing agents and the action thereof, are employed generically to include any reaction mechanism(s) by which said agents react with said newly reduced metal ions to provide said delay or extension in gelling time.

In the method of this invention it is essential that the complexing agent be mixed with the polymer solution which contains the multivalent metal-containing compound prior to adding the reducing agent in order to maintain desirable gel time control. If the reducing agent is added to the first mixture with or before the complexing agent, there will be less control over the gel time and a gel can be formed which has a viscosity greater than desirable. Where the viscosity of the gelled polymer solution being passed into the formation is high, it is more difficult to readily and easily distribute the gelled solution through the flow channels. In some cases where gelation has progressed rapidly, the viscosity of the gelled solution can be so great that the gel cannot be passed into the formation.

In one embodiment of the invention the third mixture is passed downwardly through a well bore and into and through the subterranean formation to a desired location. Pumping of materials into the well bore is thereafter terminated and the polymer is maintained at the desired location until the materials gel. Thereafter the well is placed back in operation. Other embodiments of the invention include using said third mixture to decrease the mobility of a drive fluid, or decrease the permeability of a formation, in secondary recovery processes. Further details of the processes comprising said other embodiments can be found in U.S. Pat. No. 3,727,687. See particularly column 7, line 47 to column 8, line 68.

The following are examples of preferred methods of this invention and the gelled solutions of this invention compared to heretofore utilized methods.

EXAMPLE I

First mixture comprises fresh water, 5000 ppm CMC 9H, and 1250 ppm of $Na_2Cr_2O_7 \cdot 2H_2O$.

Material added to said first mixture to form a second mixture was 2500 ppm citric acid.

Material added to said second mixture to form a third mixture was 1250 ppm sodium bisulfite.

A control solution identical to the above solution was formed except the citric acid was omitted. Said control solution began to thicken in about 15 minutes. The above solution of this invention containing the citric acid began to thicken in about 25 minutes. This difference in gelling time period is exceedingly important in situations where the material must be pumped into a formation which is located several thousand feet below the ground surface.

EXAMPLE II

A 3000 ppm solution of CMC 9H was mixed in simulated Arbuckle formation brine water containing 47,000 ppm total dissolved solids. A portion of the solution was gelled with 75 ppm of sodium dichromate and 75 ppm of sodium hydrosulfite. The solution gelled within 3 minutes.

An identical second portion of said CMC solution was gelled with the same amounts of said gelling agents except that 2 drops of green food coloring per 100 ml of polymer solution was added before the reducing agent was added. The green food coloring (organic complexing agent) used was a solution reported to contain water, propylene glycol, and 2.5 percent of the disodium salt of 4-{[4-(N-ethyl-p-sulfobenzylamino)-phenyl]-(4-hydroxy-2-sulfoniumphenyl)-methylene -} [1-(N-ethyl-N-p-sulfobenzyl)- $\Delta^{2,5}$-cyclohexadienimine]. This solution gelled in about 20 minutes. With the 20-minute delay in gelation obtained with said green food coloring, we were able to inject a 3000 ppm polymer solution into an Ottawa sand pack. After an overnight set period we were unable to inject any brine into the sand pack at 100 psi. Prior to this invention a 1000 ppm gelled solution of polymer was the maximum injectable into a comparable sand pack.

EXAMPLE III

A 5000 ppm solution of CMC 9H was prepared in tap water and gelation thereof was caused by adding thereto 1250 ppm sodium dichromate and 1250 ppm of sodium bisulfite, Gel time was about 15 minutes. Another solution was prepared using the same amounts of chemicals, but 3 cc/liter of said solution of the above green food coloring was added before adding the sodium bisulfite. The solution began to thicken in one hour and gelled solid overnight. The food coloring organic complexing agent used was the same as used in Example II.

EXAMPLE IV
Comparative Runs
Viscosity, cp at 170 sec$^{-1}$

| Time, Min. | Run 1 | Run 2 | Run 3 | Run 4 |
|---|---|---|---|---|
| 0 | 68 | 62 | 45 | 45 |
| 5 | 90 | 65 | 50 | 45 |
| 10 | 150 | 70 | 85 | 55 |
| 15 | 265 | 85 | 180 | 105 |
| 20 | 440 | 120 | 320 | 260 |
| 25 | 610 | 180 | 480 | 500 |
| 30 | 760 | 255 | 600 | 715 |
| 35 | 865 | 345 | 760 | 860 |
| 40 | 900+ | 435 | 900 | 900+ |
| 45 | — | 520 | — | — |
| 50 | — | 615 | — | — |
| 55 | — | 690 | — | — |
| 60 | — | 810 | — | — |
| 65 | — | 900 | — | — |

Compositions tested: All four contained 5000 ppm CMC 9H, 1250 ppm $Na_2Cr_2O_7 \cdot 2H_2O$, and 1250 ppm $NaHSO_3$ in fresh water. Said four compositions differed only in whether or not they contained citric acid, and in order of addition as set forth below.

Run 1  (a) 1250 ppm $Na_2Cr_2O_7 \cdot 2H_2O$
       (b) 1250 ppm $NaHSO_3$
       (c) No citric acid Run 2  (a) 1250 ppm $Na_2Cr_2O_7 \cdot 2H_2O$
       (b) 1250 ppm $NaHSO_3$
       (c) 2500 ppm citric acid (added before the $NaHSO_3$)

Run 3  (a) 1250 ppm $Na_2Cr_2O_7 \cdot 2H_2O$
       (b) 1250 ppm $NaHSO_3$
       (c) 2500 ppm citric acid (added within 30 seconds of $NaHSO_3$)

Run 4  (a) 1250 ppm $Na_2Cr_2O_7 \cdot 2H_2O$
       (b) 1250 ppm $NaHSO_3$
       (c) 2500 ppm citric acid (added at same time as the $NaHSO_3$)

The above four different methods of mixing the ingredients used in preparing the gelled solutions of the invention have been tested. The method of the above Run 2 is the procedure for mixing said ingredients in accordance with this invention. In the control test shown in Run 1 of the above table, the polymer, the reducing agent, and the oxidizing agent were mixed together (no citric acid) and the viscosity measured in centipoise at 170 sec$^{-1}$ employing a Fann Model 35 viscosimeter. In Run 1, a gel having 900+ centipoise after 40 minutes was obtained. The reason the test was stopped at 900 centipoise is that this is the limit of the viscosimeter which was utilized for the measurements.

Run 3 was made using the same basic solution as in Run 1 except that 2500 ppm citric acid was added within 30 seconds after the $NaHSO_3$ was added. The viscosity of this solution attained 900 centipoise in 40 minutes.

Run 4 was made using the same basic solution as Run 3 except that the $NaHSO_3$ and citric acid were added at the same time. In this run a 900 centipoise viscosity was attained in 40 minutes.

These three runs, namely Runs 1, 3, and 4, demonstrate different ways of mixing the acid (or no acid) into the solution. Said three runs demonstrate that there was no appreciable difference in the gelling time of the polymer solution and, in fact, no difference in gelling time to 900 CP viscosity when citric acid was not used, as in Run 1.

Run 2 demonstrates the method of the present invention in that the complexing agent, e.g., citric acid, was added before the reducing agent, e.g., $NaHSO_3$. In this particular instance, the 900 centipoise viscosity was attained in 65 minutes, i.e., it required 25 more minutes for the solution to gel to the same viscosity than was required in Runs 1, 3, and 4. It should also be noted that in Run 2 after 30 minutes the viscosity of the solution was only 255 CP, whereas in Runs 1, 3, and 4 the viscosity was at least 600 CP. Run 2 clearly demonstrates the operability and practicability of this invention in delaying or extending the gelling time of the CMC solution. The delay or extension in gelling time can be varied by varying the amount of complexing agent, e.g., citric acid, which is mixed into the solution prior to the addition of the reducing agent. Different amounts of reducing agent and oxidizing agent can be used, as well as varying the amount of polymer, e.g., CMC, used in particular combinations, to produce variations in the gelling time of polymer solutions. The present tests, however, definitely indicate that when a delay or extension in gelling time is desired, it can be achieved when a complexing agent, e.g., citric acid, is placed in the solution prior to the addition of the reducing agent.

Other modifications and alterations of this invention will become apparent to those skilled in the art from the foregoing discussion and examples and it should be understood that this invention is not to be unduly limited to said examples.

We claim:

1. A method for altering the permeability of a subterranean formation with a gelled solution of a polymer having an increased gel time, which method comprises:
   mixing (a) one of a polyacrylamide, a polysaccharide, a cellulosic polymer, or mixtures thereof, (b) a compound of a multivalent metal capable of furnishing multivalent metal ions, and (c) water, to form a first mixture;
   thereafter mixing a complexing agent with said first mixture to form a second mixture;
   thereafter forming a third mixture by mixing with said second mixture a reducing agent capable of reducing at least a portion of said multivalent metal ions to a reduced valence state and cause gelation of said solution;
   said complexing agent being capable of complexing with at least a portion of said reduced multivalent metal ions to provide said increased gel time; and
   passing said third mixture having an increased gel time into said formation.

2. A method according to claim 1 wherein said first mixture is an aqueous solution having a polymer concentration in the range of about 250 ppm to about 20,000 ppm, and said multivalent metal compound is sodium dichromate present in a concentration in the range of about 10 ppm to about 2500 ppm.

3. A method according to claim 1 wherein the water of said first mixture is one of fresh water on brine.

4. A method according to claim 1 wherein said complexing agent is one of citrate, acetate, or arsenate.

5. A method according to claim 1 wherein said complexing agent is citric acid.

6. A method according to claim 1 wherein said second mixture has a complexing agent concentration in the range of about 5 ppm to about 5000 ppm.

7. A method according to claim 1 wherein said reducing agent is sodium hydrosulfite.

8. A method according to claim 1 wherein said third mixture has a reducing agent concentration in the range of about 5 ppm to about 2500 ppm.

9. A method according to claim 1 wherein:
   said polymer is a carboxymethyl cellulose and the concentration thereof in said first mixture is within the range of from 250 to 20,000 ppm;
   said multivalent metal compound is sodium dichromate and the concentration thereof in said first mixture is within the range of from 10 to 2500 ppm;
   said complexing agent is citric acid and the concentrations thereof in said second mixture is within the range of from 5 to 5,000 ppm; and
   said reducing agent is sodium hydrosulfite or sodium bisulfite and the concentration thereof in said third mixture is within the range of from 5 to 2500 ppm.

10. In a method wherein an aqueous gel is introduced into a borehole in the earth and into a subterranean formation penetrated by said borehole, the improvement wherein said aqueous gel has an extended gelation time and comprises water to which there has been added:
    a water-thickening amount of a water-dispersible polymer selected from the group consisting of (a) water-soluble cellulose ethers, (b) polyacrylamides and polymethacrylamides wherein up to about 75 percent of the carboxamide groups can be hydrolyzed to carboxyl groups; crosslinked polyacrylamides and crosslinked polymethacrylamides wherein up to about 75 percent of the carboxamide groups can be hydrolyzed to carboxyl groups; polyacrylic acid and polymethacrylic acid; polyacrylates; polymers of N-substituted acrylamides wherein the nitrogen atoms in the carboxamide groups can have from 1 to 2 alkyl substituents which contain from 1 to 4 carbon atoms; copolymers of acrylamide with another ethylenically unsaturated monomer copolymerizable therewith, sufficient acrylamide being present in the monomer mixture to impart said water-dispersible properties to the resulting copolymer when it is mixed with water, and wherein up to about 75 percent of the carboxamide groups can be hydrolyzed to carboxyl groups; and mixtures thereof; and (c) a biopolysaccharide produced by the action of bacteria of the genus Xanthomonas on carbohydrates;
    an amount of a water-soluble compound of a polyvalent metal wherein the metal present is capable of being reduced to a lower polyvalent valence state and which amount is sufficient to cause gelation of said water containing said polymer when the valence of at least a portion of said metal is reduced to said lower valence state;
    an amount of a complexing agent capable of complexing with ions of said metal in said reduced valence state; and sufficient to complex with at least a portion of said ions and cause said extended gelation time; and
    an amount of a water-soluble reducing agent which is effective to reduce at least a portion of said metal to said lower valence state, with said reducing agent being added to said water after said complexing agent has been added thereto.

11. A method according to claim 10 wherein there has been added to said water:
    from 0.025 to 5 weight percent of said cellulose ether, based upon the weight of said water;
    from 0.05 to 40 weight percent of said compound of a polyvalent metal, based upon the weight of said cellulose ether;

from 10 to 300 weight percent of said complexing agent, based upon the weight of said polyvalent metal compound; and from 0.1 to at least about 200 percent of the stoichiometric amount of said reducing agent required to reduce said polyvalent metal to said lower polyvalent valence state.

12. A method according to claim 11 wherein:

said cellulose ether is a carboxymethyl cellulose ether;

said polyvalent metal compound is a compound of chromium selected from the group consisting of ammonium chromate, ammonium dichromate, the alkali metal chromates and dichromates, chromium trioxide, and mixtures therof; and said reducing agent is selected from the group consisting of sodium sulfide, sodium hydrosulfite, sodium metabisulfite, sodium bisulfite, sodium thiosulfate, potassium sulfide, potassium hydrosulfite, potassium metabisulfite, potassium bisulfite, potassium thiosulfate, and mixtures thereof.

13. A method according to claim 12 wherein:

said cellulose ether is sodium carboxymethyl cellulose;

said polyvalent metal compound is sodium dichromate; and said complexing agent is citric acid.

14. A method according to claim 13 wherein:

from 0.025 to 2 weight percent of said cellulose ether has been added to said water;

from 2 to 30 weight percent of said sodium dichromate has been added to said water; and from 50 to 250 weight percent of said citric acid has been added to said water.

* * * * *